July 25, 1939.  S. A. MOSS  2,167,487

DYNAMO-ELECTRIC MACHINE

Filed July 31, 1937

Inventor:
Sanford A. Moss,
by Harry E. Dunham
His Attorney.

Patented July 25, 1939

2,167,487

UNITED STATES PATENT OFFICE 2,167,487

DYNAMO-ELECTRIC MACHINE

Sanford A. Moss, Lynn, Mass., assignor to General Electric Company, a corporation of New York Application July 31, 1937, Serial No. 156,742

4 Claims. (Cl. 171—252)

My invention relates to improvements in dynamo-electric machines, and more particularly to an improved ventilating system for such machines.

An object of my invention is to provide an improved ventilating or cooling system for dynamo-electric machines.

Another object of my invention is to provide an improved rotatable member construction for dynamo-electric machines.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
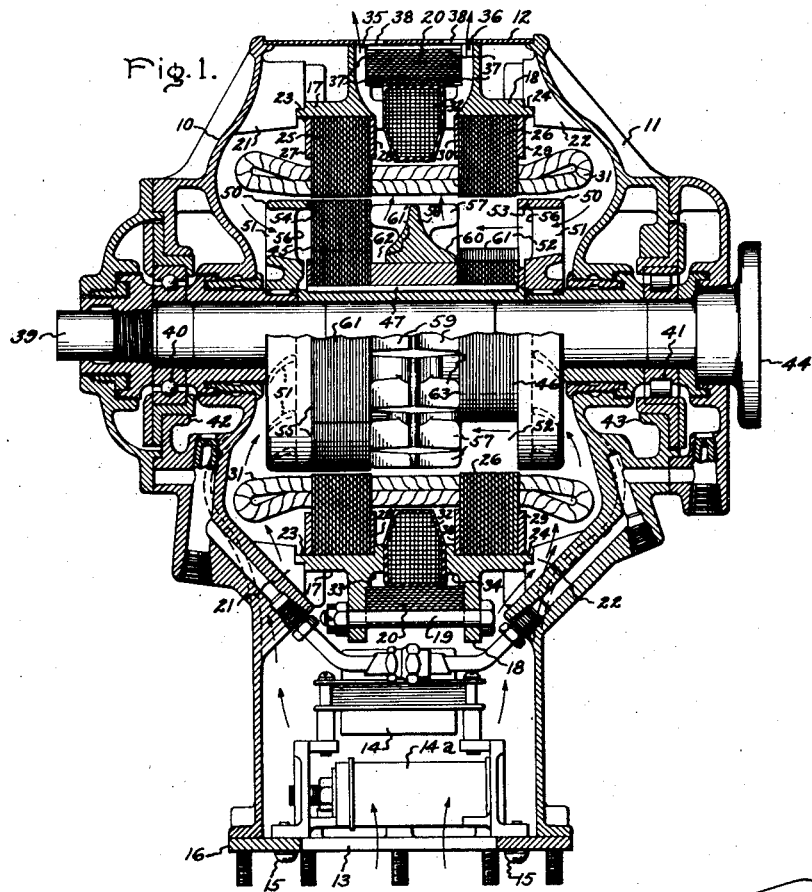
Figure 2:
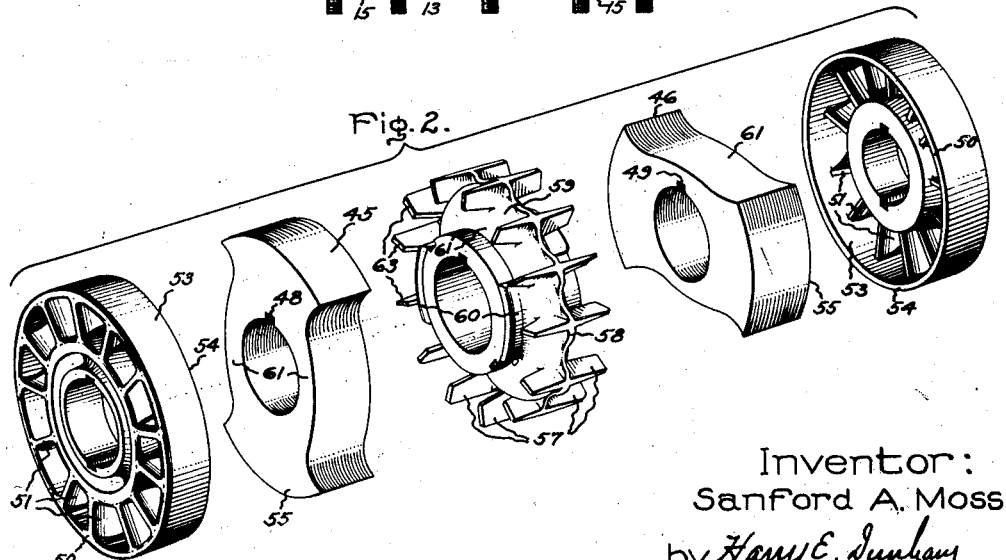

For a better understanding of my invention, reference is made to the accompanying drawing wherein Fig. 1 is a sectional view partly in elevation of a dynamo-electric machine embodying my invention, and Fig. 2 is an exploded perspective view of the elements of the rotatable member shown in Fig. 1.

Referring to the drawing, I have shown an inductor type dynamo-electric machine provided with a stationary member having a supporting frame or casing formed of two end shields 10 and 11 secured and connected together by a plate 12 extending peripherally about the central portion of the machine. A ventilating intake opening 13 is formed in the bottom end of the casing to provide an inlet passage for cooling air into the interior of the machine, and auxiliary equipment comprising a transformer 14 and copper oxide rectifiers 14a are arranged over this intake opening 13 in the path of the cooling medium, and secured by screws 15 to a base 16 forming the bottom plate of the stationary member frame or casing. The stationary member is provided with an annular supplementary frame, which is formed of two annular members 17 and 18 secured together by a plurality of axially extending bolts 19 spaced apart by an annular laminated permanent magnet core 20. The supplementary frame comprising the annular members 17 and 18 is supported upon the end shields 10 and 11 by a plurality of bosses 21 and 22 formed on the end shields 10 and 11, respectively, which engage annular flanges 23 and 24 formed on the annular elements 17 and 18, respectively. Two concentric radially extending laminated cores 25 and 26 are secured between plates 27 and 28, and 29 and 30, to the annular frames 17 and 18, respectively. The auxiliary annular frames 17 and 18, and the annular core members 20, 25, and 26, and the supporting plates 27, 28, 29, and 30 are formed of magnetic material and form the magnetic circuit of the stationary member of the dynamo-electric machine. A stationary armature winding 31 is arranged in slots formed around the inner periphery of the laminated cores 25 and 26, and the excitation of the dynamo-electric machine is provided by a field exciting winding 32 which extends annularly about, and adjacent to the inner surface of the annular laminated core 20, and outside of the armature winding 31. This field exciting winding 32 is secured in position by annular flanges 33 and 34 formed on the auxiliary stationary frame members 17 and 18, and is energized by current rectified by the rectifiers 14a from the armature winding 31. The permanent magnet core 20 provides the necessary excitation for the build-up of the machine. The stationary member of the dynamo-electric machine is arranged so that it is essentially a scroll for an impeller type fan having the inlet opening 13 in one end thereof which communicates with annular passages between the end shields 10 and 11 and the annular cores 25 and 26, and provided with an exhaust scroll including an annular passage formed between the annular laminated cores 25 and 26 and the field exciting winding 32 and the annular flanges 33 and 34. Exhaust ports or openings 35 and 36 are formed in the annular frames 17 and 18 respectively. Tapered recesses 37 are formed in the annular laminated core 20 and cooperate with the exhaust openings 35 and 36 to provide exhaust ports communicating with a plurality of exhaust ports or openings 38 formed in the cylindrical plate or casing 12.

The rotatable member of the dynamo-electric machine is provided with a shaft 39 supported by bearings 40 and 41 arranged in hubs 42 and 43 formed on the end shields 10 and 11, respectively, and is provided with a coupling member 44 secured to one end of the shaft and arranged to be driven by any suitable source of power. The rotatable member of the dynamo-electric machine comprises two similar units arranged on each side of the central cooling air exhaust passage. Each of these units is provided with a set of laminated salient pole pieces 45 and 46 secured in angularly displaced relation by a key 47 arranged in the keyways 48 and 49 of the pole pieces 45 and 46 respectively. In electrical apparatus, it is desirable to cool the core of the apparatus, as the heating of a machine generally is the limiting factor in determining its capacity, and in order to properly cool dynamo-electric machines, various arrangements of ventilating passages have been provided for conducting a cooling medium through the machine. The ventilating system of each rotatable member unit, that is, of each set of salient pole pieces, is constructed so that it is essentially a ventilating impeller or fan. Each outer end of the rotatable member is provided with an annular plate 50 made of a high resistance aluminum alloy, or similar high resistance non-magnetic material, which will not affect the magnetic circuit of the machine and will not produce appreciable eddy current losses. Each of these annular plates 50 is provided with axially extending curved ventilating intake vanes 51 providing impeller surfaces arranged to direct a cooling medium over the salient pole pieces 45 and 46 into a plurality of axially extending ventilating passages 52 formed between adjacent pole pieces of each set of pole pieces. The outer peripheral edge of the annular plate 50 is formed with an axially extending annular flange or ring 53, and the inner side 54 of this ring is arranged in engagement with the outer edge 55 of the laminated pole pieces 45 and 46 and acts as a retaining ring for clamping and supporting the outer ends of the laminated pole pieces in position. Furthermore, since no axial ventilating passages are formed through the salient pole pieces, the cooling medium which enters through the ventilating openings formed between the curved intake vanes 51, which are arranged adjacent the outer face of the salient pole pieces, is directed over this outer surface through a circumferentially extending passage between it and the inner edges 56 of the intake vanes 51, into the axial ventilating passages between the pole pieces, and thereby cools the pole pieces. The cooling air is exhausted from the rotatable member and blown into the annular passage formed in the stationary member between the cores 25 and 26 and out through the exhaust openings 38 in the casing by a fan arranged axially between the two sets of pole pieces 45 and 46 and provided with a plurality of impeller fan blades or exhaust vanes 57 arranged on the sides of the salient pole pieces opposite the annular plates 50. The fan blades 57 extend axially in both directions from a central radially extending supporting body 58 which is formed with gradually curved surfaces 59 changing from an axial surface at the base of the core to a radially extending surface at the outer edge of the core to direct the axially flowing air outwardly. The portions 60 of the body 58 adjacent the axial ventilating passages 52 between the salient pole pieces 45 and 46 extend axially into engagement with the intermediate sections 61 of the laminations joining the pole pieces and forming the bottom of the axial ventilating passages 52. The portions 61' of the body 58 adjacent the salient pole pieces do not extend axially as far as the inner side of the pole pieces and thereby provide a circumferentially extending ventilating passage 62 between the base 61' of the fan and the salient pole pieces through which cooling air may be drawn in from the axial passages 52 between the pole pieces and flow over the inner surfaces thereof. Since the pole pieces are angularly displaced with respect to each other, the portions 60 of the body 58 also are formed in a correspondingly angularly displaced relation on opposite sides of the core. The outer radially extending edges 63 of the fan blades 57 are arranged in engagement with the outer edges on the inner sides of the laminated pole pieces for clamping and supporting them in position. Thus, the rotatable member of the dynamo-electric machine is essentially an impeller fan with intake vanes, intermediate axial ventilating passages, and exhaust vanes or blades, and the stationary member of the dynamo-electric machine is essentially a scroll having an intake opening and an annular passage for directing the cooling air into the intake vane passages, and an exhaust passage for directing the air from the exhaust vanes to the exhaust ports or openings in the casing. The arrows in Fig. 1 indicate generally the direction of the air flow through the dynamo-electric machine, and show how the cooling air enters through the intake opening 13 in the stationary member and flows around the scroll like ventilating passages between the end bells 10 and 11 and the annular laminated cores 25 and 26 and the winding 31, into the rotor intake vane passages to the rotor axial passages 52, and out of the exhaust blade passages into the annular ventilating passage formed between the laminated cores 25 and 26, about the field exciting winding 32 and the laminated core 20, and out through the exhaust ports or openings 38 in the casing of the stationary member.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. A dynamo-electric machine having a stationary member and a rotatable member arranged to provide a ventilating impeller fan for said dynamo-electric machine, sets of salient pole pieces on said rotatable member having axially extending ventilating passages extending between said pole pieces, ventilating passages through said stationary member, an axial air gap extending between said stationary member and said rotatable member, intake ventilating vanes arranged on said rotatable member in communication with each outer end of said rotatable member axial passages and arranged to provide circumferentially extending passages between said salient pole pieces and adjacent vanes communicating with said rotatable member axial passages, and discharge vanes associated with said rotatable member and arranged intermediate said sets of salient pole pieces in communication with all of said ventilating passages.

2. A dynamo-electric machine having a stationary member and a rotatable member arranged to provide a ventilating impeller fan for said dynamo-electric machine, sets of salient pole pieces on said rotatable member and axially extending ventilating passages extending between said pole pieces, said sets of salient pole pieces being angularly displaced from each other, ventilating passages through said stationary member, a plate having intake ventilating vanes arranged adjacent each end of said rotatable member to clamp said salient pole pieces thereto with said ventilating vanes in communication with said rotatable member axial passages, and discharge vanes arranged intermediate said sets of salient pole pieces in communication with all of said ventilating passages.

3. A dynamo-electric machine having a stationary member and a rotatable member arranged to provide a ventilating impeller fan for said dynamo-electric machine, sets of salient pole pieces on said rotatable member and axially extending ventilating passages extending between said pole pieces, said sets of salient pole pieces being angularly displaced from each other, ventilating passages through said stationary member, means including clamping members at opposite ends of said rotatable member for securing thereto said salient pole pieces, said clamping members having intake ventilating vanes arranged to direct a ventilating medium into each end of said rotatable member axial passages, and discharge vanes arranged intermediate said sets of salient pole pieces to direct the ventilating medium outwardly.

4. A dynamo-electric machine having a stationary member provided with a casing having an intake opening, a plurality of cores for said stationary member spaced apart to form an annular passage centrally of said casing, said casing having an exhaust opening communicating with said annular passage, a rotatable member provided with salient pole pieces, axially extending ventilating passages extending between said salient pole pieces, intake ventilating impeller surfaces carried by said rotatable member directing a ventilating medium into said axial ventilating passages and providing circumferential ventilating passages extending between said salient pole pieces and adjacent impellers, and ventilating discharge means associated with said rotatable member in communication with said axially extending ventilating passages for directing a ventilating medium into said annular passage to said exhaust opening in said casing.

SANFORD A. MOSS.